UNITED STATES PATENT OFFICE.

WILLIAM G. HALL, OF CALIFORNIA, PENNSYLVANIA.

PAINT-VEHICLE AND METHOD OF MAKING SAME.

1,279,106.   Specification of Letters Patent.   Patented Sept. 17, 1918.

No Drawing.   Application filed September 20, 1917.   Serial No. 192,389.

*To all whom it may concern:*

Be it known that I, WILLIAM G. HALL, a citizen of the United States, residing at California, in the county of Washington and State of Pennsylvania, have invented a new and useful Paint-Vehicle and Methods of Making the Same, of which the following is a specification.

This invention has reference to vehicles for paint pigments, and the method of manufacturing the vehicle. The object of the invention is to provide a vehicle of especially economical composition, capable of other uses than as an ingredient of paint, and of elastic nature drying more rapidly than ordinary paint vehicles and with which oils frequently used as adulterants will not mix.

In accordance with the invention, green woods such as cedar and pine, although other woods may be used, are associated with green or crude turpentine in substantially equal parts. The mixture of green woods and turpentine is placed in a still and heated to a temperature which will cause the sap or oil from the woods to be separated therefrom, while the lighter substances pass off as vapor and are condensed by a worm or other like means. The heavier residue of the woods mixes with the residue of the green turpentine and the woody matter is removed from the mixture while the latter is still hot, the residue hardening when cold. The light condensed oils are mixed with the residue when the latter is melted by heat in a proportion of two parts of the oil to one part of the residue or slag.

The green or crude turpentine is that which is obtained in the usual manner from the turpentine trees, while the green woods are obtained from living trees. The heat employed in the distilling operation is about that known as steam heat.

The mixture of the condensed oils or distillates may be made with the heavier constituents or residuum in the still, while such residuum is still hot and therefore fluid. The resultant mixture remains liquid. If the oil of distillation and the residuum are kept separate they may be subsequently mixed, but in such case the residuum must be heated until it is melted.

Either the oil alone may be used for various purposes or the mixture may be used in making different kinds of paints by the addition of the usual pigments employed in paint making, instead of the customary practice of using linseed oil and turpentine of commerce for the purpose.

When the distilled oil and the residuum combined are used as a vehicle for lead and color, the paint thus produced is of an elastic nature and is resistant to heat and cold and strongly adherent to the surface upon which it is placed, wherefore the paint will neither crack off or be otherwise easily displaced.

While the best results are obtained by mixing two parts of the oil with one part of the residuum or slag, good results are obtained by somewhat varying these proportions and by employing a sufficient quantity of the slag mixed with the oil, the quantity or bulk is increased and the paint is correspondingly cheapened, while in addition thereto a very desirable gloss is imparted to the paint.

The oil obtained by distillation may be used as a vehicle for varnishes and gums and has a flashing point near that of Japan drier. The vehicle is quick drying and has a high gloss.

In the distilling operation there is obtained a watery substance constituting about one-third of the distillate and this separates from the oil, which latter is quite inflammable. The watery constituent of the distillate is discarded.

The lighter oil is useful for cleaning clothing, automobiles and various other articles from foreign substances.

An analysis of a sample made in accordance with the invention shows the following characteristics:

Specific gravity at 22° C. equals___ 0.9183
Flash point (open) equals_____ 33° C.
Fire point (open) equals_____ 39° C.
Volatile matter by weight at 150°
  C. equals_____ 60%
Iodin value_____ 185.0
Acid value, due to residue_____ 30
Saponification value_____ 53
Unsaponifiable_____ 17.1%

From the tests made it has been found that the material dries with a hard durable film quite as impervious to atmospheric agencies including acids, moisture and change of temperature, as varnish, and mixed with pigments will give a hard lasting coat particularly useful where subjected to acid fumes.

What is claimed is:

1. An oil for use as a vehicle for paint and for other purposes, comprising distillates from a mixture of crude turpentine and green woods.

2. A vehicle for paints, varnishes and other purposes, comprising distillates from a mixture of green woods and crude turpentine, and the residue of the materials from which the distillates have been driven off and the wood has been removed subsequently mixed therewith.

3. A vehicle for paints and for other purposes, comprising distillates from a mixture of substantially equal parts of green woods and crude turpentine, with the residue of the distillation after the wood is removed mixed in a liquid state with the distillates in the proportion of substantially two parts of the distillates to one part of the residue.

4. The process of producing an oil for paints, varnishes and other purposes, consisting in subjecting a mixture of green woods and crude turpentine to heat to drive off the lighter ingredients, condensing said lighter ingredients, separating the woody matter from the residue, and then mixing a portion of the residue with said lighter ingredients.

5. The process of producing an elastic gloss-giving oil to serve as a vehicle for paints and other purposes, consisting in subjecting a mixture of green woods and crude turpentine in substantially equal parts to heat to drive off the more volatile constituents and retain the heavier constituents, condensing the volatile constituents thus driven off, separating the wood from the heavier constituents, and mixing with the volatile constituents a portion of the heavier constituents while the latter are hot.

In testimony that I claim the foregoing as my own I have hereto affixed my signature in the presence of two witnesses.

WILLIAM G. HALL.

Witnesses:
JOSEPH BASTOW,
B. E. McGRANAHAN.

Copies of this patent may be obtained for five cents each, by addressing the "Commissioner of Patents, Washington, D. C."